United States Patent

[11] 3,623,942

[72] Inventor Kenneth B. Yerrick
   Midland, Mich.
[21] Appl. No. 53,695
[22] Filed July 9, 1970
[45] Patented Nov. 30, 1971
[73] Assignee Dow Corning Corporation
   Midland, Mich.

[54] METHOD OF DAMPING VIBRATION AND ARTICLE
   2 Claims, No Drawings

[52] U.S. Cl. .................................................. 161/206,
   156/306, 161/162, 161/165, 161/207, 161/401,
   181/33 G, 260/37 SB, 260/46.5 G, 260/448.2 N
[51] Int. Cl. .......................................................... B32b 25/20,
   C08f 11/04, E04b 1/98
[50] Field of Search .......................................... 161/162,
   165, 206, 207; 181/33 A, 33 G, 33 GA; 260/37 BS,
   46.5 E, 46.5 G, 448.2 N; 156/306

[56] References Cited
   UNITED STATES PATENTS

| | | | |
|---|---|---|---|
| 3,024,146 | 3/1962 | Bueche et al. | 161/206 |
| 3,142,610 | 7/1964 | Lowe | 161/207 |
| 3,428,599 | 2/1969 | Newing | 260/37 SB |
| 3,541,044 | 11/1970 | Beers et al. | 260/37 SB |
| 3,549,744 | 12/1970 | Compton | 260/37 SB |
| 3,551,377 | 12/1970 | Andrianovich | 260/375 B |
| 3,553,072 | 1/1971 | Oberst et al. | 161/165 |
| 3,557,245 | 1/1971 | Phillips et al. | 260/37 SB |
| 3,565,858 | 2/1971 | Kniege et al. | 260/37 SB |

OTHER REFERENCES

Chemical Abstracts No. 65:10,610a, Vol. 65, 1966
Chemical Abstracts No. 69:59,613e, Vol. 69, 1968
Chemical Abstracts No. 70:78,066r, Vol. 70, 1969

*Primary Examiner*—John T. Goolkasian
*Assistant Examiner*—George W. Moxon, II
*Attorneys*—Robert F. Fleming, Jr., Laurence R. Hobey, Harry D. Dingman, Howard W. Hermann and Roger H. Borrousch

ABSTRACT: The vibration of two interacting members are dampened by interposing between the two members by an elastomer which is prepared by milling 100 parts by weight of a polydiorganosiloxane gum containing phenyl radicals, 40 to 70 parts by weight of a reinforcing silica filler, $CH_3(C_6H_5)_2SiNHX$ where X is a hydrogen atom or $-Si(C_6H_5)_2CH_3$ and from 0.1 to 5 parts by weight of an organic peroxide and heating the milled mixture above 100° C. until a cured elastomer is obtained. The articles prepared by the method have the vibration dampened.

METHOD OF DAMPING VIBRATION AND ARTICLE

This invention relates to an improved method of damping vibration. More specifically this invention relates to a method of damping vibration by employing an organosiloxane elastomer and articles so dampened.

The use of elastomers to dampen vibration in mechanical devices has been known for some time. Also the use of organosiloxanes to dampen vibrations is known. Organosiloxane elastomers with improved vibration damping properties, however, are still being sought, also a means to control the amount of damping of vibrations is desirable.

It is therefore an object of the present invention to provide an improved method of damping vibration by using an organosiloxane elastomer and to provide articles with improved vibrational damping. This object and others will become more apparent from the following detailed description of the present invention.

This invention relates to an improvement in a method of damping the interaction of at least two rigid members one of which is movable, the improvement consisting essentially of interposing between said two members an elastomer prepared by mixing 100 parts by weight of a polydiorganosiloxane gum having a unit formula of $R_2SiO$ where R is selected from the group consisting of methyl, phenyl and vinyl radicals, said units are bonded to one another through silicon-oxygen-silicon bonds, from 2 to 50 percent of the R groups of said polydiorganosiloxane being phenyl and from 0 to 2 percent of the R groups of said polydiorganosiloxane being vinyl, said polydiorganosiloxane having endblocking units selected from the group consisting of hydroxyl radicals and $R_3SiO_{0.5}$ units, from 40 to 70 parts by weight of a reinforcing silica filler and a silicon compound of the formula $CH_3(C_6H_5)_2SiNHX$ where X is selected from the group consisting of a hydrogen atom and $-Si(C_6H_5)_2CH_3$ in an amount sufficient to provide a weight ratio of silica filler to silicon compound of from 2 to 4.5 inclusive, and from 0.1 to 5 parts by weight of an organic peroxide and thereafter heating the milled mixture above 100° C. until a cured elastomer is obtained.

The method of damping the interaction of two rigid members one of which is movable to absorb the vibrational movement by use of an organosiloxane is known in the art. The method comprises interposing between the two members an elastomer of organosiloxane. Such methods of damping the vibration in mechanical devices are well known to those skilled in the art. The method comprises two rigid members one of which is movable, however, more than two rigid members can be interacting. The rigid member or members which are movable interact with each other or a stationary member and thus are subject to vibration which can cause harm to a machine or produce undue noise unless such vibration is absorbed by some vibration-absorbing means. Thus, a vibration-absorbing means, such as an elastomer, is used to dampen the vibration and thus protect the machine or reduce the noise level. The elastomer can be interposed between the rigid members by any conventional manner, such as bonding the elastomer to one or more of the rigid members, to the stationary or movable members or both and the like. The elastomer thus contacts the rigid members whether all members are bonded together or one or more members are not bonded but contact the elastomer. The elastomer can be cured in place or it can be cured and then adhered to the rigid member or members by means of an adhesive and the like.

The improvement in the method of damping the interaction of at least two rigid members one of which is movable is that said members have interposed therebetween an elastomer. Said elastomer is prepared by mixing 100 parts by weight of a polydiorganosiloxane gum, from 40 to 70 parts by weight of a reinforcing silica filler and a silicon compound of the formula $CH_3(C_6H_5)_2SiNHX$ in an amount sufficient to provide a weight ratio of silica filler to silicon compound of from 2 to 4.5 inclusive and from 0.1 to 5 parts by weight of an organic peroxide and thereafter the milled mixture is heated above 100° C. until a cured elastomer is obtained.

The ingredients can be mixed by a number of conventional compounding techniques used in the preparation of rubber compositions, such as by milling on a rubber mill or other mechanical mixer. Preferably, the polydiorganosiloxane, the silicon compound and the silica filler are mixed, such as on a mill or other mechanical mixer, until the ingredients are thoroughly mixed. The presence of small amounts of water in the mixture of ingredients up to 10 parts by weight per 100 parts by weight of polydiorganosiloxane gum are preferred during the mixing. The mixture is then heated between 100° C. and 200° C. for at least 1 hour, preferably under reduced pressure. The heating can be carried out while the mixture is being mixed or in an oven. If heated in an oven, the mixture is then mixed, such as by milling, and the organic peroxide is added and thoroughly mixed into the composition. Since the organic peroxide is a heat activated catalyst, the mixture is cooled prior to addition of the organic peroxide. The silicone elastomer composition can then be stored until used. When vulcanization is desired, the composition is heated above 100° C. until the elastomer is cured. The vulcanization temperature will depend upon the particular peroxide used, since each peroxide is best activated at some range of temperatures.

The polydiorganosiloxane gum has a unit formula of $R_2SiO$ where R is methyl, vinyl or phenyl radicals. The units are bonded together through silicon-oxygen-silicon bonds. From 2 to 50 percent of the R radicals in the polydiorganosiloxane gums are phenyl radicals and from 0 to 2 percent of the R radicals are vinyl radicals. The $R_2SiO$ units can be represented by dimethylsiloxane units, phenylmethylsiloxane units, diphenylsiloxane units and methylvinylsiloxane units. The polydiorganosiloxane gums have hydroxyl endblocking or $R_3SiO_{0.5}$ units as endblocking units where R is defined above. The polydiorganosiloxane gums are those polymers having viscosities in excess of 1,000,000 cs. at 25° C. Any other organosiloxane units can be present in trace amounts without departing from the present invention.

The reinforcing silica fillers are well known in the art, can be purchased commercially and can be any of those which are conventionally used in silicone rubbers such as those having surface area greater than 100 square meters per gram. These reinforcing silica fillers are known as fume silica, silica aerogels, silica xerogels, precipitated silicas and the like.

The silicon compound has a formula $CH_3(C_6H_5)_2SiNHX$ where X is a hydrogen atom or $-Si(C_6H_5)_2CH_3$. These silicon compounds can be prepared from methyldiphenylchlorosilane and ammonia in an organic solvent such as toluene. This reaction produces both $CH_3(C_6H_5)_2SiNH_2$ and $CH_3(C_6H_5)_2SiNH-Si(C_6H_5)_2CH_3$. The mixture of silicon compounds can be used after the ammonium chloride is filtered from the solution and the organic solvent is stripped off, or the compounds can be separated by distillation to give specific species. The silicon compound is used in an amount sufficient to provide a weight ratio of 2 to 4.5 parts by weight silica per part by weight of silicon compound. The silicon compound can be reacted with the silica filler prior to the addition of the filler to the polymer mixture, preferably however the silicon compound is added as described above.

The organic peroxide vulcanizing agent includes any of the well known organic peroxides which are suitable for vulcanizing silicone rubber. These organic peroxide vulcanizing agents include, benzoyl peroxide, tertiary butylperbenzoate, dicumyl peroxide, 2,4-dichlorobenzoyl peroxide, di-tertiary-butyl peroxide, para-dichlorobenzoyl peroxide, 2,5-bis-(tert.-butylperoxy)-2,5-dimethylhexane, tertiary-butyl-triethylmethyl peroxide, tertiary-butyl-tertiary-triptyl peroxide, monochlorobenzoyl peroxide, and tertiary-alkylperoxyalkyl carbonates such as t-butylperoxyisopropylcarbonate.

The compositions of this invention can contain other additives such as compression set additives, thermal stabilizers, oxidation inhibitors, flame retardants, plasticizers, pigments and other materials commonly employed in organosilicon rubbers.

Any static stress applied to an elastomer will result in a complex strain, which is time and temperature dependent. The deformation of an elastomer is usually a small percent of its length and often is a combination of shear, extension and/or compression. With static stress this complex quantity is referred to as stress relaxation or creep. Superimposed on the static deformations is the dynamic deformation which gives rise to the dynamic modulus.

The dynamic modulus yields three pieces of data. First the real modulus component (G') is the spring constant of the modulus and is the dominant portion of the complex modulus of most elastomers. The imaginery or loss modulus (G'') is the viscous component and it controls the damping properties of the elastomer. The vector sum of G' and G'' is the complex modulus G*. The most common manner of describing the damping properties of an elastomer is by the ratio of the imaginery component (G'') to the real or spring component (G'). This ratio is termed tan δ or the loss tangent. The units of G' and G'' are usually dynes/cm.$^2$ or p.s.i. (1 dyne/cm.$^2$=B 1.45×10$^5$ p.s.i.). The dynamic transmissibility is defined as the ratio of G' to G'' (Cot δ = G'/G'').

Thus, increasing G'' or decreasing G' will increase tan δ therefore improve the damping properties of an elastomer. The silicone elastomers provide excellent damping both at low strain deformation and retain their damping properties at higher temperatures.

The damping properties as determined herein were made on a forced vibration dynamic mechanical instrument which is designed to make forced vibrations in shear. The measurements and calculations are further defined in "Measurements of Mechanical Properties of Polyisobutylene at Audiofrequencies by a Twin Transducer," by R. S. Marvin, E. R. Fitzgerald and J. D. Ferry, Journal of Applied Physics, Volume 21, page 197 (1950) and in "Dynamic Properties of Rubber," by S. D. Gehman, D. E. Woodford and R. B. Stambaugh, Industrial and Engineering Chemistry, Volume 33, page 1,032 (1941).

Briefly, the apparatus comprises a metal bar suspended between two voice coils which are loudspeaker units with the cores removed. One is driven by suitable electronic equipment, which sets up a reciprocating vibration in the metal rod. This induces a voltage in the other voice coil. By suitable monitoring of the two signals, vibration absorbing effects of a material clamped to the central portion of the metal bar and to a stationary member of the apparatus can be determined. A sample 1 inch by 2 inches and from 50 to 80 mils thickness was mounted in the apparatus and vibrated by an oscillating shaft 0.5 inch long and 1 inch wide. Resonant measurements were made at 0.1, 1.0, 5.0 and 20.0 percent shear deformation. These vibration absorbing effects were expressed at a ratio of G'', the loss modulus to G' the elastic modulus to tan δ the dynamic loss tangent. The higher tan δ the more the elastomer dampened the vibrations. A value of tan δ equal to 0.1 indicates a resilient elastomer which a tan δ equal to 0.4 indicates a highly damping elastomer.

The following examples are for illustrative purposes only and should not be construed as limiting the present invention which is properly delineated in the claims. All parts are parts by weight unless otherwise stated.

EXAMPLE 1

On a rubber mill, 100 parts of a hydroxyl endblocked polydiorganosiloxane gum having 30 mol percent methylphenylsiloxane units and 70 mol percent dimethylsiloxane units, 50 parts of a reinforcing fumed silica filler having a surface area of 400 square meters per gram, X parts of a mixture of 86 weight percent $CH_3(C_6H_5)_2SiNH_2$ and 14 weight percent $CH_3(C_6H_5)_2SiNHSi(C_6H_5)_2CH_3$ and 2 parts of water were blended. The blended mixture was then put into a commercial micro mixer and heated for 0.5 hour by steam at 80 p.s.i. in a closed system and then for 0.5 hour under full vacuum. The resulting mixture was put on a rubber mill and 1.5 parts of tertiary butylperbenzoate was milled into the mixture. The rubber composition was then cured for 1 hour at 150° C. in test sample pieces 50–80 mils thick and 1 inch by 2 inches. These samples were then tested for vibration damping as described above. Other test pieces were cured as described above and the durometer was determined as ASTM-D-2240 procedure, and the tensile strength and elongation both at break were determined by ASTM-D-412 procedure. The results were as shown in table I.

TABLE I

| X, parts | Durometer, Shore A scale | Tensile strength, p.s.i. | Elongation, percent | Deformation, percent | G'×10$^5$ | G''×10$^5$ | Tan δ |
|---|---|---|---|---|---|---|---|
| 24 | 30 | 1,025 | 905 | 0.1 | 26.92 | 11.35 | 0.422 |
|  |  |  |  | 1.0 | 14.47 | 6.42 | 0.443 |
|  |  |  |  | 5.0 | 4.60 | 3.16 | 0.686 |
|  |  |  |  | 20.0 | 1.77 | 1.67 | 0.944 |
| 20 | 35 | 1,160 | 755 | 0.1 | 23.02 | 9.52 | 0.414 |
|  |  |  |  | 1.0 | 15.12 | 5.27 | 0.349 |
|  |  |  |  | 5.0 | 5.16 | 2.91 | 0.519 |
|  |  |  |  | 20.0 | 2.72 | 1.63 | 0.601 |
| 12,5 | 51 | 1,190 | 400 | 0.1 | 21.36 | 7.13 | 0.334 |
|  |  |  |  | 1.0 | 16.02 | 4.23 | 0.264 |
|  |  |  |  | 5.0 | 8.88 | 2.90 | 0.326 |
|  |  |  |  | 20.0 | 5.16 | 1.83 | 0.354 |
| 24 [1] | 45 | 1,355 | 795 | 0.1 | 44.62 | 14.04 | 0.315 |
|  |  |  |  | 1.0 | 23.77 | 9.33 | 0.392 |
|  |  |  |  | 5.0 | 7.77 | 4.31 | 0.555 |
|  |  |  |  | 20.0 | 2.51 | 2.20 | 0.877 |

[1] 60 parts of silica filler was used instead of 50 parts.

EXAMPLE 2

The following silicone rubbers were prepared as described in example 1 where the ingredients were as follows:

A. 100 parts of the hydroxyl endblocked polydiorganosiloxane gum as described in example 1,
   60 parts of the reinforcing silica filler as described in example 1,
   24 parts of the mixture of 86 weight percent $CH_3(C_6H_5)_2SiNH_2$ and 14 weight percent $CH_3(C_6H_5)_2SiNHSi(C_6H_5)_2CH_3$,
   2 parts of water, and
   1.0 part of tertiary butylperbenzoate.

B. The ingredients were the same as in A. above except the gum was a hydroxyl endblocked polydiorganosiloxane gum having 30 mol percent methylphenylsiloxane units, 69.858 mol percent dimethylsiloxane units and 0.142 mol percent methylvinylsiloxane units.

C. The ingredients were the same as in A. above except the gum was a methylphenylvinylsiloxy endblocked polydiorganosiloxane gum having 92.358 mol percent dimethylsiloxane units, 7.5 mol percent methylphenylsiloxane units and 0.142 mol percent methylvinylsiloxane units.

D. The ingredients were the same as in A. above except the gum was a methylphenylvinylsiloxy endblocked polydiorganosiloxane gum having 94.358 mol percent dimethylsiloxane units, 5.5 mol percent diphenylsiloxane units and 0.142 mol percent methylvinylsiloxane units. The silicone rubber compositions were cured by heating for 1 hour at 150° C. The properties were determined as described in example 1 and were shown in table II.

1.5 parts of tertiary butylperbenzoate

B. The same formulation as described in A. above, except $CH_3(C_6H)_2SiNHSi(C_6H_5)_2CH_3$ is substituted for $CH_3(C_6H)_2SiNH_2$.

TABLE II

| Formulation | Durometer, Shore A scale | Tensile strength, p.s.i. | Elongation, percent | Resilience, Bashore scale | Deformation, percent | $G' \times 10^6$ | $G'' \times 10^6$ | Tan $\delta$ |
|---|---|---|---|---|---|---|---|---|
| A | 45 | 1070 | 815 | 11 | 0.1 | 53.81 | 18.20 | 0.338 |
|   |    |      |     |    | 1.0 | 27.59 | 12.07 | 0.437 |
|   |    |      |     |    | 5.0 | 7.55  | 5.15  | 0.682 |
|   |    |      |     |    | 20.0 | 2.80 | 2.42  | 0.867 |
| B | 47 | 1210 | 735 | 15 | 0.1 | 53.01 | 22.23 | 0.419 |
|   |    |      |     |    | 1.0 | 26.98 | 11.74 | 0.435 |
|   |    |      |     |    | 5.0 | 9.41  | 5.62  | 0.598 |
|   |    |      |     |    | 20.0 | 2.76 | 2.87  | 1.042 |
| C | 51 | 1515 | 605 | 23 | 0.1 | 70.98 | 15.10 | 0.213 |
|   |    |      |     |    | 1.0 | 45.04 | 14.47 | 0.321 |
|   |    |      |     |    | 5.0 | 17.52 | 8.18  | 0.467 |
|   |    |      |     |    | 20.0 | 6.67 | 3.57  | 0.536 |
| D | 52 | 1560 | 650 | 17 | 0.1 | 90.19 | 22.24 | 0.247 |
|   |    |      |     |    | 1.0 | 54.49 | 17.27 | 0.317 |
|   |    |      |     |    | 5.0 | 18.70 | 9.12  | 0.488 |
|   |    |      |     |    | 20.0 | 7.72 | 4.01  | 0.521 |

EXAMPLE 3

Silica fillers were prepared by diluting a colloidal silica having 15.55 weight percent silica in water and a surface area of 352 square meters per gram with distilled water to provide 8.5 weight percent silica. To 1,200 grams of this diluted colloidal silica, 600 ml. of concentrated HCl was added and the mixture refluxed for 20 hours. To the resulting mixture, 885 ml. of isopropanol and 190 ml. of treating agent, either $(CH_3)_3SiOSi(CH_3)_3$ or the mixture of 86 weight percent $CH_3(C_6H_5)_2SiNH_2$ and 14 weight percent $CH_3(C_6H_5)_2SiNHSi(C_6H_5)_2CH_3$ was added and then stirred for 1 hour. Additional treating agent was added and thereafter toluene was added whereby the treated silica collected in the toluene. The toluene-silica mixture was then washed with water and the remaining water was then removed by azeotroping. The silica was then separated from the solvent by evaporating the toluene. The resulting treated silica fillers were as follows: The mole ratio of $SiO_2$ to $CH_3(C_6H)_2SiO_{0.5}$ was 15.6 and the mole ratio of $SiO_2$ to $(CH_3)_3SiO_{0.5}$ was 13.4.

The above treated silica fillers were used in preparing silicone elastomers. The silicone elastomer compositions were prepared by milling 100 parts of a hydroxyl endblocked polydiorganosiloxane gum having 99.5 mol percent methylphenylsiloxane units and 0.5 mole percent methylvinylsiloxane units and 50 parts of the treated silica filler. After heating the mixture for 3 hours at 150° C., the mixture was cooled and 0.5 part of tertiary butylperbenzoate was milled in the mixture. The silicone elastomer composition was cured for 1 hour at 150° C. and the properties were determined as described in example 1 and were as shown in table III.

TABLE III

| Treating agent | Durometer, Shore A scale | Tensile strength, p.s.i. | Elongation, percent | Deformation, percent | $G' \times 10^6$ | $G'' \times 10^6$ | Tan $\delta$ |
|---|---|---|---|---|---|---|---|
| $CH_3(C_6H_5)_2SiO_{0.5}$ | 42 | 780 | 335 | 0.1 | 28.90 | 17.43 | 0.60 |
|   |    |     |     | 1.0 | 22.30 | 11.80 | 0.53 |
|   |    |     |     | 5.0 | 7.85 | 4.95 | 0.63 |
|   |    |     |     | 20.0 | 4.04 | 2.70 | 0.67 |
| $(CH_3)_3SiO_{0.5}$ | 60 | 1,020 | 220 | 0.1 | 46.96 | 17.11 | 0.36 |
|   |    |       |     | 1.0 | 36.84 | 11.83 | 0.32 |
|   |    |       |     | 5.0 | 18.47 | 8.36 | 0.45 |
|   |    |       |     | 20.0 | 8.60 | 3.49 | 0.41 |

EXAMPLE 4

When the following formulations are substituted for the first formulation of example 1, equivalent damping properties are obtained.

A. 100 parts of the gum as described in example 1,
  50 parts of the silica filler as described in example 1,
  20 parts of $Ch_3(C_6H_5)_2SiNH_2$.
  2 parts of water and That which is claimed is:

1. In a method of damping the interaction of at least two rigid members one of which is movable, the improvement consisting essentially of interposing between said two members an elastomer prepared by mixing 100 parts by weight of a polydiorganosiloxane gum having a unit formula of $R_2SiO$ where R is selected from the group consisting of methyl, phenyl and vinyl radicals, said units are bonded to one another through silicon-oxygen-silicon bonds, from 2 to 50 percent of the R groups of said polydiorganosiloxane being phenyl and from 0 to 2 percent of the R groups of said polydiorganosiloxane being vinyl, said polydiorganosiloxane having endblocking units selected from the group consisting of hydroxyl radicals and $R_2SiO_{0.5}$ units, from 40 to 70 parts by weight of a reinforcing silica filler and a silicon compound of the formula $CH_3(C_6H)_2SiNHX$ where X is selected from the group consisting of a hydrogen atom and $-Si(C_6H_5)_2CH_3$ in an amount sufficient to provide a weight ratio of silica filler to silicon compound of from 2 to 4.5 inclusive, and from 0.1 to 5 parts by weight of an organic peroxide and thereafter heating the milled mixture above 100° C. until a cured elastomer is obtained.

2. An article of manufacture comprising at least two rigid members one of which is movable, said members having interposed therebetween an elastomer prepared by mixing 100 parts by weight of a polydiorganosiloxane gum having a unit formula of $R_2SiO$ where R is selected from the group consisting of methyl, phenyl and vinyl radicals, said units are bonded to one another through silicon-oxygen-silicon bonds, from 2 to 50 percent of the R groups of said polydiorganosiloxane being vinyl, said polydiorganosiloxane having endblocking units selected from the group consisting of hydroxyl radicals and $R_3SiO_{0.5}$ units, from 40 to 70 parts by weight of a reinforcing silica filler and a silicon compound of the formula $CH_3(C_6H_5)_2SiNHX$ where X is selected from the group consisting of a hydrogen atom and $-Si(C_6H_5)_2CH_3$ in an amount sufficient to provide a weight ratio of silica filler to silicon compound of from 2 to 4.5 inclusive, and from 0.1 to 5 parts by weight of an organic peroxide and thereafter heating the milled mixture above 100° C. until a cured elastomer is obtained.